(12) United States Patent
Doron et al.

(10) Patent No.: US 8,371,742 B2
(45) Date of Patent: Feb. 12, 2013

(54) HORIZONTAL MIXING TRAILER SYSTEM

(76) Inventors: Daniel A. Doron, Houston, TX (US);
Leo S. Doron, Houston, TX (US)

( * ) Notice: Subject to any disclaimer, the term of this patent is extended or adjusted under 35 U.S.C. 154(b) by 0 days.

(21) Appl. No.: 13/127,278

(22) PCT Filed: Nov. 3, 2009

(86) PCT No.: PCT/US2009/063157
§ 371 (c)(1),
(2), (4) Date: May 3, 2011

(87) PCT Pub. No.: WO2010/062772
PCT Pub. Date: Jun. 3, 2010

(65) Prior Publication Data
US 2011/0211421 A1 Sep. 1, 2011

Related U.S. Application Data

(60) Provisional application No. 61/110,626, filed on Nov. 3, 2008.

(51) Int. Cl.
*B01F 7/04* (2006.01)
(52) U.S. Cl. ............ 366/270; 366/296; 366/325.92
(58) Field of Classification Search .......... 366/64, 366/66, 67, 99, 143, 276–278, 297–301, 366/325.92, 325.93, 326.1, 292–296, 270
See application file for complete search history.

(56) References Cited

U.S. PATENT DOCUMENTS

| | | | |
|---|---|---|---|
| 4,157,872 A * | 6/1979 | Davido, Sr. ............... 366/64 |
| 4,322,169 A * | 3/1982 | Wood ........................ 366/77 |
| 4,599,004 A | 7/1986 | Keith |
| 4,951,883 A | 8/1990 | Loppoli et al. |
| 5,094,541 A | 3/1992 | Nelson |
| 5,269,604 A | 12/1993 | Ewers |
| 5,380,085 A | 1/1995 | Milek |
| 5,409,310 A * | 4/1995 | Owczarz ................. 366/136 |
| 5,429,434 A | 7/1995 | Milek |
| 5,470,147 A | 11/1995 | Duckworth |
| 5,489,152 A * | 2/1996 | Rumph ...................... 366/311 |
| 5,507,572 A * | 4/1996 | Shields et al. ............... 366/6 |
| 5,603,568 A | 2/1997 | Mobley et al. |
| 5,609,416 A | 3/1997 | Duckworth |
| 5,624,183 A | 4/1997 | Schuff |
| 5,785,420 A | 7/1998 | Schuff |
| 5,967,657 A | 10/1999 | West |
| 6,007,233 A | 12/1999 | Cairns |
| 6,186,654 B1 | 2/2001 | Gunteret, Jr. et al. |
| 6,293,689 B1 | 9/2001 | Gunteret, Jr. et al. |
| 6,450,679 B1 | 9/2002 | Dahlinger et al. |
| 6,527,428 B2 | 3/2003 | Gunteret, Jr. et al. |

(Continued)

OTHER PUBLICATIONS

International Application No. PCT/US2009/063157 Search Report and Written Opinion dated May 19, 2010.

*Primary Examiner* — Charles E Cooley
(74) *Attorney, Agent, or Firm* — Conley Rose, P.C.

(57) ABSTRACT

An apparatus for transporting and mixing materials includes a horizontally disposed container supported by a trailer, a motor mounted on the outside of the container, a shaft coupled to the motor and horizontally disposed in the container, and a mixing pedal coupled to the shaft and horizontally disposed in the container. The apparatus may include adjustably angled mixing pedals, and also adjustably angled fins. The apparatus may include a second chamber in the container including a second motor, a second shaft and a second mixing pedal. The apparatus may include a centrifugal pump for moving fluids into and out of the two chambers, as well as between the two chambers. The centrifugal pump may also power the two motors hydraulically.

20 Claims, 5 Drawing Sheets

U.S. PATENT DOCUMENTS

| | | |
|---|---|---|
| 6,588,082 B2 | 7/2003 | Dahlinger et al. |
| 7,004,615 B2 | 2/2006 | Despres et al. |
| 2007/0000545 A1 | 1/2007 | Cannon et al. |
| 2008/0094939 A1* | 4/2008 | Wenger et al. ............... 366/301 |

* cited by examiner

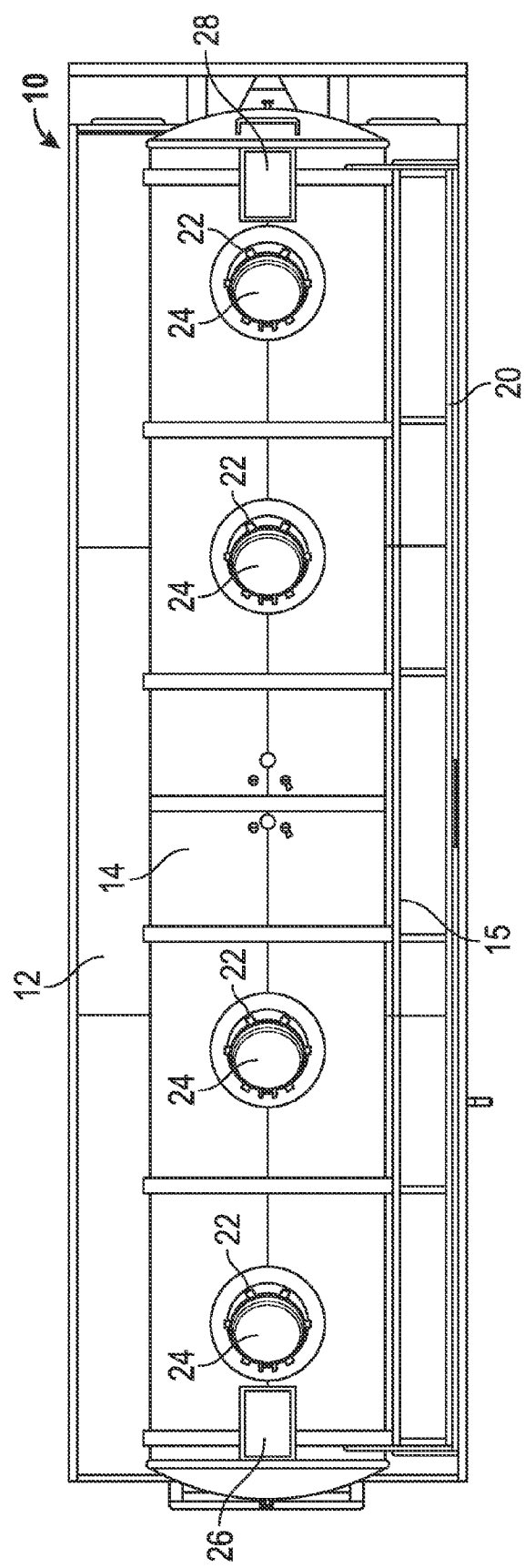

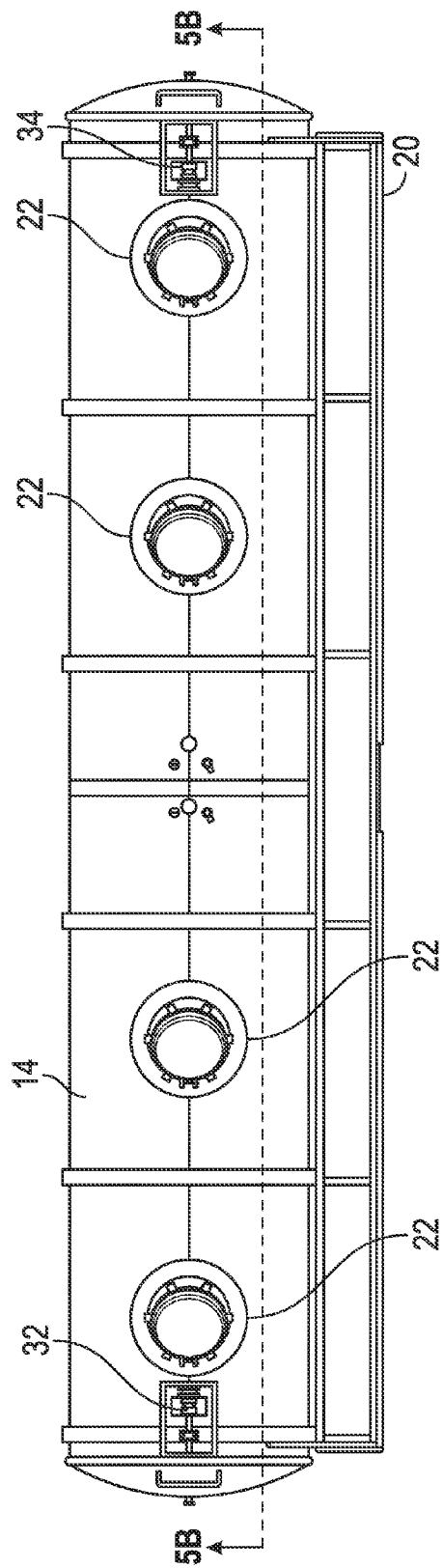
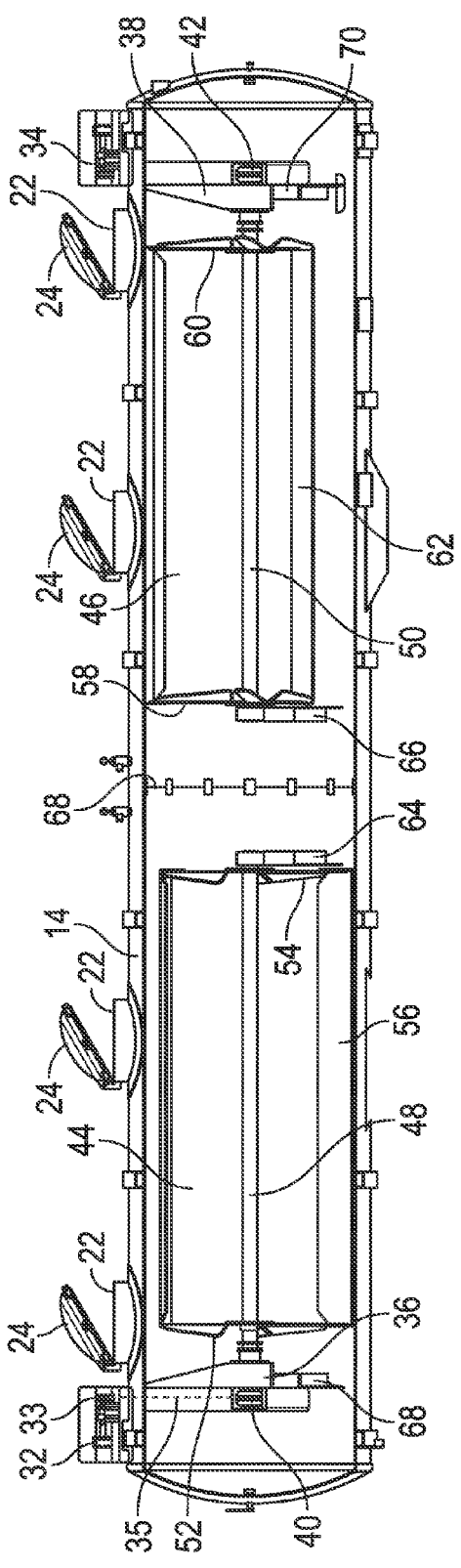
FIG. 5A
FIG. 5B

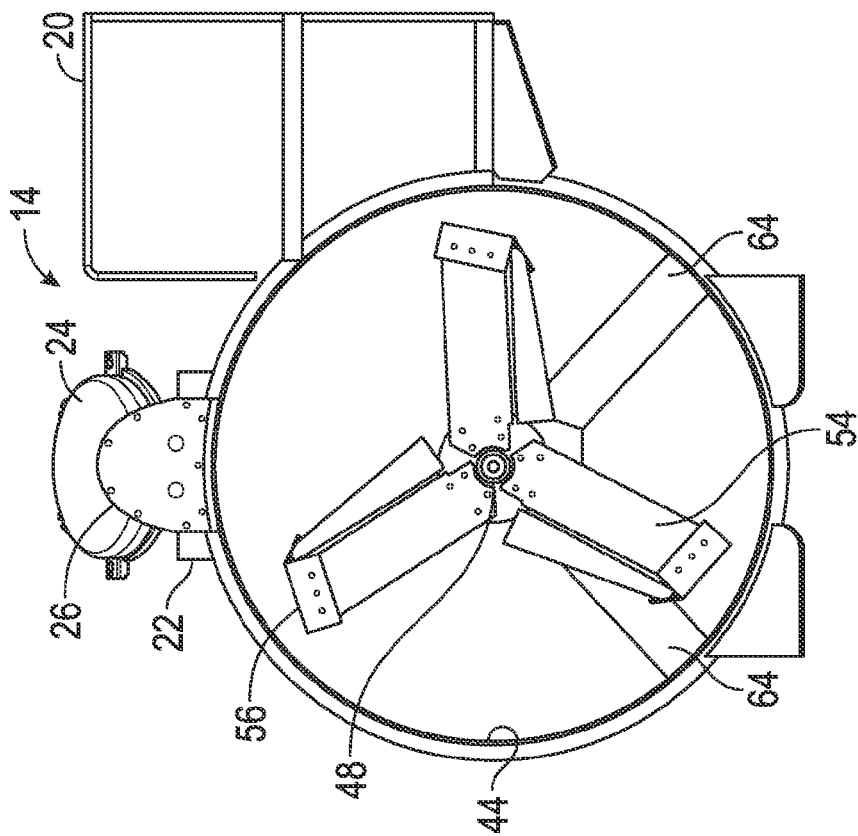
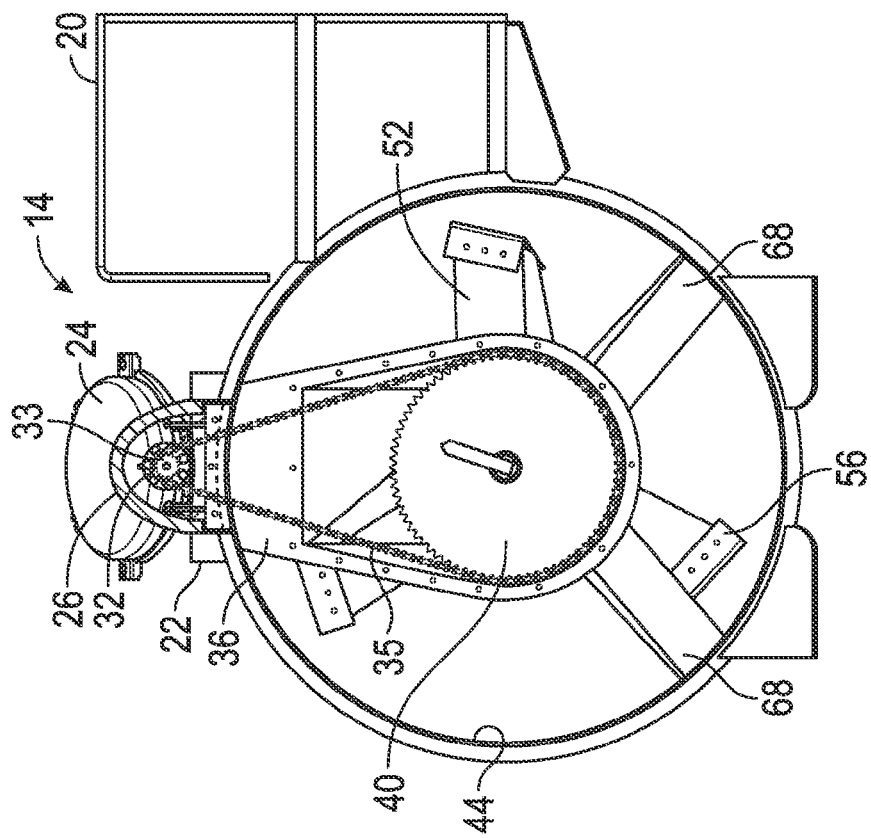

HORIZONTAL MIXING TRAILER SYSTEM

This application is the U.S. National Stage Under 35 U.S.C. §371 of International Patent Application No. PCT/US2009/063157 filed Nov. 3, 2009, which claims the benefit of U.S. Provisional Application Ser. No. 61/110,626, filed Nov. 3, 2008 and entitled "Horizontal Mixing Trailer System."

STATEMENT REGARDING FEDERALLY SPONSORED RESEARCH OR DEVELOPMENT

Not applicable.

BACKGROUND

Certain liquids and other viscous materials require transport and delivery by trailers often moved by trucks. Containers on the trailers retain the materials while they are transported. In some circumstances, it is necessary to agitate or mix the materials to maintain a homogenous state or a desirable consistency of the material. Thus, the container may be provided with mixing mechanisms to agitate the contained materials during transport. However, current designs are overly complex and difficult to maintain, while also failing to properly agitate the entire body of material to maintain homogeneity and consistency. Also, current designs often do not provide means for transporting multiple different materials at the same time. Further, manipulation of the different materials into, out of, or between separate mixing chambers is impossible or ineffective.

The principles of the present disclosure are directed to overcoming one or more of the limitations of existing mixing trailer systems.

SUMMARY

An embodiment of an apparatus for transporting and mixing materials includes a horizontally disposed container, a motor mounted externally of the container, a shaft coupled to the motor and horizontally disposed in the container, and a mixing pedal coupled to the shaft and horizontally disposed in the container. In some embodiments, the apparatus includes a set of fins coupling the mixing pedals to the shaft. In some embodiments, the apparatus includes a second chamber in the container including a second motor mounted externally of the second chamber, a second shaft coupled to the second motor and horizontally disposed in the second chamber, and a second mixing pedal coupled to the second shaft and horizontally disposed in the second chamber. The apparatus may include a centrifugal pump for moving fluids into and out of the two chambers, as well as for hydraulically powering the two motors.

An embodiment of an apparatus for transporting and mixing materials includes a horizontally disposed container supported by a trailer frame, at least one hydraulic motor mounted on the container, at least one gear disposed inside the container and coupled to the hydraulic motor, at least one shaft coupled to the gear, and at least one mixing pedal coupled to the shaft. In some embodiments, the apparatus includes at least one fin coupling the mixing pedal to the shaft. In some embodiments, the apparatus includes the fin and the mixing pedal being adjustably angled.

An embodiment of an apparatus for transporting and mixing materials includes a generally horizontally disposed container, a motor supported by the container, a shaft coupled to the motor and generally horizontally disposed in the container, and a mixing pedal coupled to the shaft and horizontally disposed in the container. The motor may be mounted externally of the container. A gear assembly may be coupled between the motor and the shaft. The apparatus may include a fin coupling the mixing pedal to the shaft. The fin and the mixing pedal may be adjustably angled. The fin may be configured to agitate the materials in a generally horizontal direction and the mixing pedal may be configured to agitate the materials in a generally vertical direction. The apparatus may further include a second chamber in the container including a second motor mounted externally of the second chamber, a second shaft coupled to the second motor and horizontally disposed in the second chamber, and a second mixing pedal coupled to the second shaft and horizontally disposed in the second chamber. The apparatus may further include a trailer frame supporting the container. The trailer frame may include a power supply assembly. The power supply assembly may include a centrifugal pump. The trailer frame may include a wheel assembly, and the trailer frame may be removably coupled to a truck for transport.

An embodiment of an apparatus for transporting and mixing materials includes a horizontally disposed container supported by a trailer frame, a first chamber in the container including a first horizontally disposed shaft and a first mixing pedal coupled thereto, and a second chamber in the container including a second horizontally disposed shaft and a second mixing pedal coupled thereto. The apparatus may further include a first gear assembly coupling a first motor to the first shaft and a second gear assembly coupling a second motor to the second shaft. The first and second shafts may be rotatable in opposite directions. The apparatus may further include a centrifugal pump. The centrifugal pump may be fluidicly coupled between the first and second chambers. The centrifugal pump may provide a fluid path to an external container.

An embodiment of a method of transporting and mixing materials includes loading the materials into a horizontally disposed container supported by a trailer frame and rotating a horizontally disposed shaft and a horizontally disposed mixing pedal coupled to the shaft to agitate the materials. The method may include coupling the mixing pedal to the shaft with a fin and agitating the materials in one direction with the mixing pedal and agitating the materials in another direction with the fin. The method may further include loading another quantity of the materials into another chamber of the container and rotating a second horizontally disposed shaft and a second horizontally disposed mixing pedal coupled to the second shaft to agitate the other quantity of materials. The method may further include rotating the shafts in opposite directions to create offsetting torsional forces. The method may further include pumping the materials between the chambers. The method may further include pumping the materials between at least one of the chambers and an external container. The method may further include coupling the trailer frame to a truck and transporting the container with the truck.

BRIEF DESCRIPTION OF THE DRAWINGS

For a more detailed description of preferred embodiments of the present disclosure, reference will now be made to the accompanying drawings, wherein:

FIG. 2 is a top view of the mixing trailer system of FIG. 1;

FIG. 5a is a top view of the mixing container of FIG. 1;

FIG. 5b is a section view of the mixing container of FIG. 5a taken at the section A-A;

FIG. 6a is a section view of the mixing container of FIG. 5a taken perpendicular to the section view of FIG. 5b; and FIG. 6b is a second section view of the mixing container of FIG. 5a taken perpendicular to the section view of the FIG. 5b.

DETAILED DESCRIPTION

Figure 1:
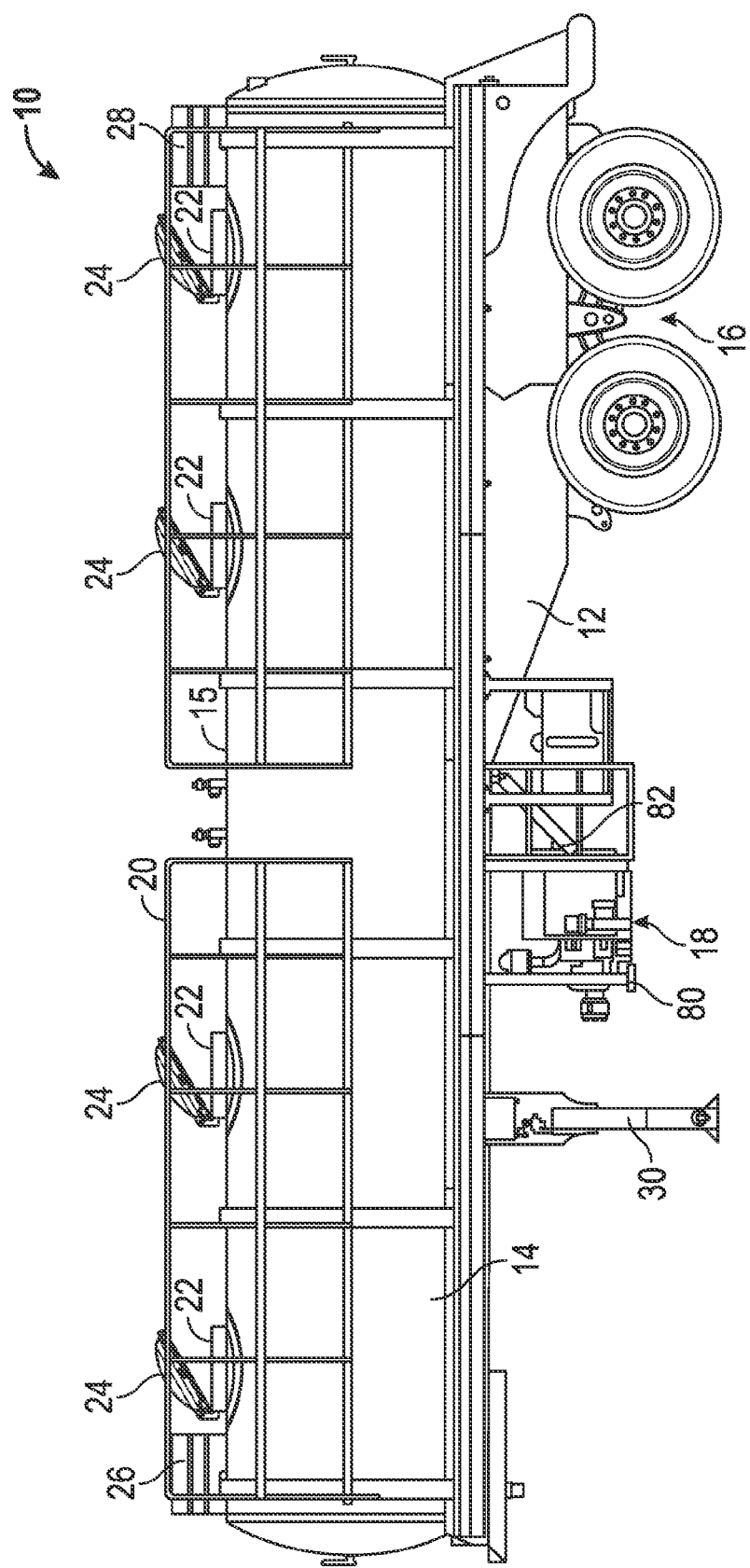
FIG. 1 is a side view of an embodiment of a mixing trailer system in accordance with principles presented herein.

In the drawings and description that follow, like parts are typically marked throughout the specification and drawings with the same reference numerals. The drawing figures are not necessarily to scale. Certain features of the disclosure may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

In the following discussion and in the claims, the terms "including" and "comprising" are used in an open-ended fashion, and thus should be interpreted to mean "including, but not limited to . . . ". Unless otherwise specified, any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

With reference to FIG. 1, a side view shows a mixing trailer system 10 including a trailer frame 12 supporting a container 14. The container 14 is generally horizontally disposed, meaning the long axis of the container 14 is generally horizontal. The support frame 12 includes a wheel assembly 16, a power supply assembly 18 and a support leg 30. The container 14 includes a generally cylindrical body 15 with a personnel frame 20 mounted thereto and a series of access ports 22 and moveable covers 24. The container also includes a front motor housing 26 and rear motor housing 28 mounted thereon. The power assembly 18 includes a pump 80 and at least one conduit 82. In some embodiments, the pump 80 is a centrifugal pump.

Referring to FIG. 2, the access ports 22 and covers 24 are disposed axially along the upper portion of the container 14. The motor housings 26, 28 are disposed at either end.

Figure 4:
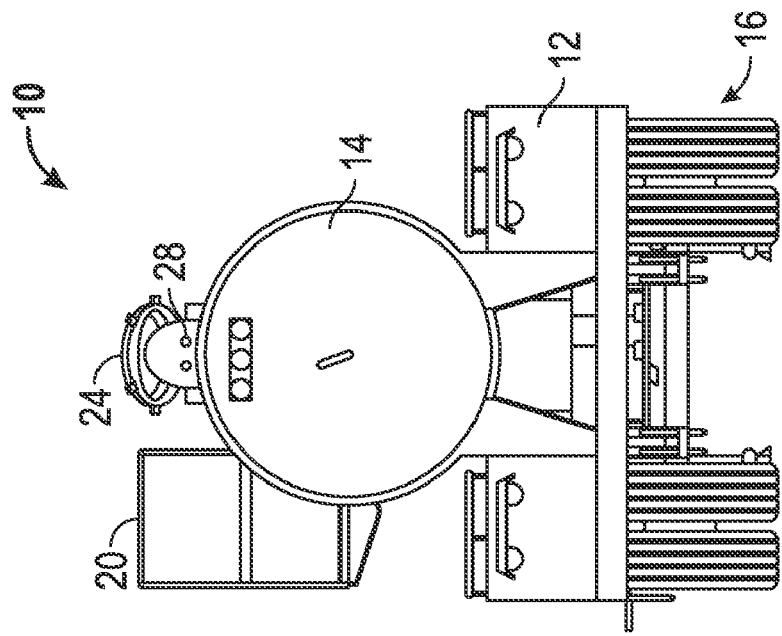
FIG. 4 is a rear view of the mixing trailer system of FIG. 1.
Figure 3:
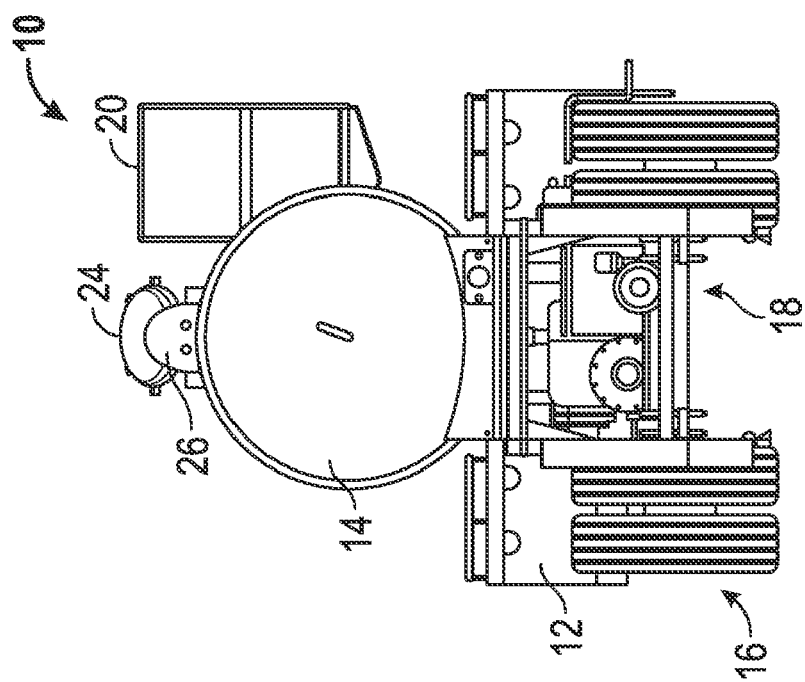
FIG. 3 is a front view of the mixing trailer system of FIG. 1.

Referring to FIG. 3, the power supply assembly 18 is mounted underneath the frame 12 in front of the wheel assembly 16 and is operably coupled to different portions of the container 14 and its powered components. For example, the centrifugal pump 80 is hydraulically coupled to a front hydraulic motor 32 (see FIG. 5a) in the housing 26 and a rear hydraulic motor 34 in the housing 28. The centrifugal pump 80 provides hydraulic fluid to drive the motors 32, 34. In other embodiments, the motors receive other types of power from the power supply assembly 18, such as electrical. The centrifugal pump 80 may also be fluidicly coupled to the container 14, and provide outlets to be fluidicly coupled to external containers, as will be described further herein. The personnel frame mounted on the side of the container 14 allows operator access to the access ports 22 and the motor housings 26, 28. FIG. 4 shows similar features.

Referring now to FIG. 5a, the container 14 is shown from a top view with the trailer frame 12 and the housings 26, 28 removed. The housings protect the front hydraulic motor 32 and the rear hydraulic motor 34.

Referring now to FIG. 5b, the section A-A of FIG. 5a reveals the inner parts of the container 14. A front chamber 44 contains a front gear housing 36 including a gear assembly 40. In some embodiments, the assembly 40 includes a gear, a set of gears, a gear box or a differential. The gear assembly 40 is operably coupled to the hydraulic motor 32, such as by a drive shaft, and to a front mixing shaft 48. The gear housing 36 and the shaft 48 are supported by a set of front supports 64, 68. The shaft 48 is coupled to a first set of radial fins 52 and a second set of radial fins 54. The fins 52, 54 are coupled to a set of axial or longitudinal fins 56, also called mixing pedals. The chamber 44 is separated from a rear chamber 46 by a dividing wall 68. The rear chamber 46 contains a rear gear housing 38 including a gear assembly 42. The gear assembly 42 is operably coupled to the hydraulic motor 34, such as by a drive shaft, and to a rear mixing shaft 50. The gear housing 38 and the shaft 50 are supported by a set of rear supports 66, 70. The shaft 50 is coupled to a third set of radial fins 58 and a fourth set of radial fins 60. The fins 58, 60 are coupled to a set of horizontal mixing pedals 62.

Referring now to FIG. 6a, a first radial section view of the container 14 of FIG. 5b is taken through the housing 26 and hydraulic motor 32 and just in front of the front gear housing 36. The radial fins 52 are rotatable in the chamber 44 by the drive mechanism provided by the gear assembly 40 and the hydraulic motor 32. The motor 32 drives the gear assembly 40, which rotates the shaft 48, which rotates the fins 52 and the mixing pedals 56.

Referring now to FIG. 6b, a second, partial radial section view of the container 14 of FIG. 5b is taken through the container 14 just in front of the fins 54. In the manner just described, the radial fins 54 are rotated by the shaft 48.

In operation, the container 14 may receive mixing materials through inlet ports fluidicly coupled to the centrifugal pump 80, or through the access ports 22. In some embodiments, the chambers 44, 46 are filled or loaded with the same materials. In other embodiments, the chambers 44, 46 are filled or loaded with different materials. When filled, the hydraulic motors 32, 34 may be actuated to begin the mixing process. In exemplary embodiments, the motors 32, 34 are operated simultaneously to mix materials in both chambers 44, 46. In other embodiments, the motors 32, 34 are operated separately. For purposes of description, particular reference is made to the motor 32 and the chamber 44, with the understanding that such teachings apply to the motor 34 and the chamber 46.

The motor 32 is actuated to rotate the drive shaft and the gear assembly 40. The drive motion from the motor 32 is then transferred to the shaft 48 internally of the container 14. The fins 52, 54 and mixing pedals 56 are also driven by this rotating action. Further, the horizontally disposed shaft 48 allows the mixing pedals 56 to also be horizontally disposed in the chamber 44. As shown in FIGS. 5b, 6a and 6b, the fins 52, 54 and the mixing pedals 56 are angled or pitched to induce mixing or agitation of the contained materials. The angle or pitch of the fins and pedals can be variously controlled and adjusted according to design specifications and mixing material requirements. Furthermore, the angled fins 52, 54 agitate the materials in a generally horizontal direction while the angled mixing pedals 56 agitate in a generally vertical direction, thereby furthering the effect of the overall agitation of the system. The principles just described apply also to components in the chamber 46, such as the fins 58, 60 and the mixing pedals 62.

In some embodiments, the shafts 48, 50 are rotated in opposite directions to create offsetting torsional forces produced by the rotating drive mechanisms.

The conduit 82 and other lines coupled to the container 14 provide multiple fluid paths between the chambers 44, 46, the centrifugal pump 80, and external fluid containers. For example, the centrifugal pump 80 is fluidicly coupled to one or more external containers as well as the chambers 44, 46, and is operable to separately move fluids into or out of the chambers 44, 46. Furthermore, the conduit 82 and other fluid lines provide a fluid path between the chambers 44, 46 and through the centrifugal pump 80. The centrifugal pump 80 is adapted to move fluids in one of the chambers 44, 46 to the other of the chambers 44, 46 via this fluid path. In addition, the centrifugal pump 80 is adapted to provide hydraulic fluids to the motors 32, 34. In some embodiments, the system 10 includes external level gauges for indicating the fluid levels in each of the chambers 44, 46.

While embodiments of the disclosure have been shown and described, modifications thereof can be made by one skilled in the art without departing from the spirit and teachings of the disclosure. The embodiments described and the examples provided herein are exemplary only, and are not intended to be limiting. Many variations and modifications of the disclosure disclosed herein are possible and are within the scope of the disclosure. Accordingly, the scope of protection is not limited by the description set out above, but is only limited by the claims which follow, that scope including all equivalents of the subject matter of the claims.

What is claimed is:

1. An apparatus for transporting and mixing materials, comprising:
    a generally horizontally disposed container;
    a motor mounted externally of the container;
    a gear housing mounted internally of the container;
    a gear assembly disposed in the gear housing;
    a shaft generally horizontally disposed in the container and coupled to the gear assembly through the gear housing; and
    an angled mixing pedal coupled to the shaft and horizontally disposed in the container;
    wherein the motor is operably coupled to the gear assembly to transfer external motor actuation to internal rotation of the shaft through the gear housing.

2. The apparatus of claim 1 further comprising an angled fin coupling the angled mixing pedal to the shaft.

3. The apparatus of claim 2 wherein the fin and the mixing pedal are angled based on a mixing material requirement.

4. The apparatus of claim 2 wherein the fin is configured to agitate the materials in a generally horizontal direction and the mixing pedal is configured to agitate the materials in a generally vertical direction.

5. The apparatus of claim 1 further comprising a second chamber in the container including:
    a second motor mounted externally of the second chamber;
    a second shaft coupled to the second motor and horizontally disposed in the second chamber; and
    a second mixing pedal coupled to the second shaft and horizontally disposed in the second chamber.

6. The apparatus of claim 1 further comprising a trailer frame supporting the container.

7. The apparatus of claim 6 wherein the trailer frame includes a power supply assembly.

8. The apparatus of claim 7 wherein the power supply assembly includes a centrifugal pump fluidicly coupled to the container and hydraulically coupled to the motor.

9. The apparatus of claim 6 wherein the trailer frame includes a wheel assembly, and the trailer frame is removably coupled to a truck for transport.

10. An apparatus for transporting and mixing materials, comprising:
    a horizontally disposed container supported by a trailer frame;
    a first chamber in the container including a first horizontally disposed internal shaft and a first mixing pedal coupled thereto;
    a first internal gear assembly operably coupling a first external motor to the first internal shaft through a first internal gear housing;
    a second chamber in the container including a second horizontally disposed internal shaft and a second mixing pedal coupled thereto; and
    a second internal gear assembly operably coupling a second external motor to the second internal shaft through a second internal gear housing.

11. The apparatus of claim 10 wherein the first and second shafts are rotatable in opposite directions.

12. The apparatus of claim 10 further comprising a centrifugal pump hydraulically coupled to the first and second motors.

13. The apparatus of claim 12 wherein the centrifugal pump is fluidicly coupled between the first and second chambers.

14. The apparatus of claim 13 wherein the centrifugal pump provides a fluid path to an external container.

15. A method of transporting and mixing materials, comprising:
    loading a first quantity of materials into a first chamber of a horizontally disposed container supported by a trailer frame;
    loading a second quantity of materials into a second chamber of the container;
    rotating a first horizontally disposed shaft with a first gear assembly disposed inside the first chamber, thereby rotating a first horizontally disposed mixing pedal coupled to the first shaft to agitate the first quantity of materials;
    rotating a second horizontally disposed shaft with a second gear assembly disposed inside the second chamber, thereby rotating a second horizontally disposed mixing pedal coupled to the second shaft to agitate the second quantity of materials; and
    rotating the shafts in opposite directions.

16. The method of claim 15 further comprising:
    coupling the mixing pedals to the shafts with fins; and
    agitating the materials in one direction with the mixing pedals and agitating the materials in another direction with the fins.

17. The method of claim 15 further comprising creating offsetting torsional forces by rotating the shafts in opposite directions.

18. The method of claim 15 further comprising pumping the materials between the chambers.

19. The method of claim 15 further comprising pumping the materials between at least one of the chambers and an external container.

20. The method of claim 15 further comprising coupling the trailer frame to a truck and transporting the container with the truck.

* * * * *